United States Patent [19]

Hènigue et al.

[11] Patent Number: 5,234,246
[45] Date of Patent: Aug. 10, 1993

[54] DASHBOARD

[75] Inventors: Christian Hènigue, Delle; Marcel Zundel, Montbeliard, both of France

[73] Assignee: ECIA, France

[21] Appl. No.: 887,903

[22] Filed: May 26, 1992

[30] Foreign Application Priority Data

May 24, 1991 [FR] France ................. 91 06294

[51] Int. Cl.⁵ ............................................ B60K 37/00
[52] U.S. Cl. ..................................... 296/70; 296/194; 296/197; 180/90
[58] Field of Search .............. 296/70, 194, 197; 180/90

[56] References Cited

U.S. PATENT DOCUMENTS

| 4,759,568 | 7/1988 | Paefgen et al. | 296/70 |
| 5,005,898 | 4/1991 | Benedetto | 296/194 |
| 5,082,078 | 1/1992 | Umeda et al. | 296/70 |
| 5,088,571 | 2/1992 | Burry et al. | 180/90 |
| 5,120,106 | 6/1992 | Sakurai et al. | 296/194 |

FOREIGN PATENT DOCUMENTS

| 124093 | 11/1984 | European Pat. Off. . |
| 081656 | 3/1986 | European Pat. Off. . |
| 3611486 | 10/1987 | Fed. Rep. of Germany . |
| 3806783 | 9/1989 | Fed. Rep. of Germany . |
| 2623776 | 6/1989 | France . |
| 2635069 | 2/1990 | France . |

Primary Examiner—Robert R. Song
Attorney, Agent, or Firm—Sughrue, Mion, Zinn, Macpeak & Seas

[57] ABSTRACT

This dashboard comprises, inter alia, on the one hand, a rigid, self-supporting and permanent framework (10) with a box-section member, a virtually flat panel with a perimeter whose size is adapted to that of an opening in a partition wall ($C_1$) of the structure so as to close it and be held therein by fixing zones, at least one support and at least one cavity and, on the other hand, a removably attached rigid cover (20) which fixes approximately the exterior shape of the dashboard and, finally, a removably attached lining (30) which matches this cover (20) and defines the appearance of the dashboard.

17 Claims, 9 Drawing Sheets

DASHBOARD

The present invention relates to motor vehicles and, more particularly, their dashboards.

The subject of the invention is most particularly an improved dashboard which is necessary for controlling a vehicle and which is placed in a passenger compartment in the vicinity of a front compartment, most often the engine compartment, which adjoins it. The subject of the invention is principally a dashboard intended to receive and to support, in order to be equipped therewith, prefabricated and pretested subassemblies so as to constitute an entity ready to be installed in a vehicle and fixed, at least partially, to a partition wall of the latter separating the front compartment from the passenger compartment.

It is known that a vehicle dashboard is composed of a certain number of subassemblies which are especially placed on the passenger-compartment side in relation to the partition wall or front bulkhead which separates the latter from the front compartment which adjoins it and with which it is contiguous. This adjacent front compartment is a luggage boot or a housing where, in particular, a motorised traction or motorised propulsion unit is installed.

These subassemblies in question comprise, normally, a housing for a radio, a glove box, a glove compartment, air-conditioning slots, etc., an instrument panel with dials such as a tachometer, a speed indicator, a fuel gauge, a lubricating-oil pressure warning lamp, a battery-charge warning lamp, a clock, push-buttons and switches for actuating devices such as a cigar lighter, a rear-screen defroster, lights for driving or signalling, a rear fog lamp, various warning lamps and alarm signals etc., as well as equipment and safety devices relating to the electrical system such as relays and fuses, an air conditioner with its heat exchanger and its blower, a steering column with its steering wheel, a pedal bracket with, where necessary, its brake servo and, likewise, a soundproofing or inner panel generally consisting of several elements.

It is conventional to fix the components of these various subassemblies separately, for example in the passenger compartment, on an assembly line. The volume available for doing this, especially in the passenger compartment, and its location are such that the access and clearances are relatively limited and inconvenient, with the result that installation is relatively long, fiddly, difficult and therefore expensive and a source of faults. In fact, most of the time, the operator working on the assembly line has to engage in contortions whilst holding the components and manipulating tools for them, while also managing to hold and retain them against the forces of gravity which tend to cause them to fall.

In order to overcome such a situation, automation attempts for mounting with the aid of robots and/or automata have already been proposed.

One automation solution is, for example, explained in European Patent Application 0,081,656. According to this document, the various components of a driver's cab are joined together with the aid of an assembly frame away from the actual production line of the vehicles and, after inspecting the entity which they form, all the components of this entity are put into place as a unit in the passenger compartment. It may be imagined that the formation of such a driver's cab, away from the production line and by permanently fixing the components, poses problems because the inspection is performed only when all the assembly is completed, without enabling the quality and/or the correct operation of each particular subassembly to be tested beforehand. Furthermore, as this document explains, the various components once joined together give rise, in particular, to problems of accessibility and interchangeability which are not without detriment to the maintenance and the possible repair of the vehicle.

In addition to that which has been briefly indicated above regarding the technical complexity associated with a dashboard, there are reasons for taking into account aspects involving presentation and appearance.

It is well known that the interior "trim" of a vehicle follows fashion trends and that these trends are also manifested in the presentation of the dashboard. From this general trend, each manufacturer makes his interpretation depending on the models produced for a specified series. In addition, it is known that for each model there exist several versions defined by the manufacturer and, for each of these different versions, variants, the choice of which is left up to the particular desires of the purchaser, by way of options.

It may easily be imagined that the number of solutions increases very rapidly and as a result there are particularly significant production, supply, management and cost problems as well as significant risks of errors, the number of which will also increase with the number of possibilities. This is all the more tricky to bring under control as, for economic reasons, production tends to be carried out according to the technique called "stretched flow".

The object of the invention is to overcome most of the difficulties briefly enumerated, both technical and apparent, with the aid of an improved dashboard intended to receive and to support, for being equipped therewith, prefabricated and pretested subassemblies so as to constitute an entity ready to be installed in a vehicle and to be fixed especially to a partition wall of the latter separating a front compartment from a passenger compartment.

The subject of the invention is a dashboard intended to receive and to support, for being equipped therewith, prefabricated and pretested subassemblies of a driver's cab so as to constitute an entity ready to be installed in a vehicle and to be fixed, particularly to a partition wall of the latter which separates a front compartment from a passenger compartment of the structure of the vehicle and which is pierced through by an opening with fixing zones. This dashboard is characterised in that it comprises, inter alia, a rigid, self-supporting and permanent framework which serves as support and which is fitted with a box-section member, a removably attached rigid cover which approximately fixes the exterior shape of the dashboard and, finally, a removably attached lining which matches this cover and fixes the appearance of the dashboard.

Other characteristics and advantages of the invention will emerge from reading the description and the claims which follow and by examining the attached drawing, given solely by way of example, where:

Since the techniques for constructing motor vehicles and, in particular, their dashboards, are well known in the technical field a description will be given below any of that which relates to the invention directly or indirectly. For the remainder, the specialist in the technical field in question will draw from existing conventional solutions at his disposal in order to deal with the particular problems with which he is confronted.

In the following, the same reference number always identifies an equivalent element, regardless of the embodiment.

For the convenience of the explanation, everything which contributes to the invention will be described in succession, before explaining the manner of manufacturing it and the advantages which it provides.

Figure 1:
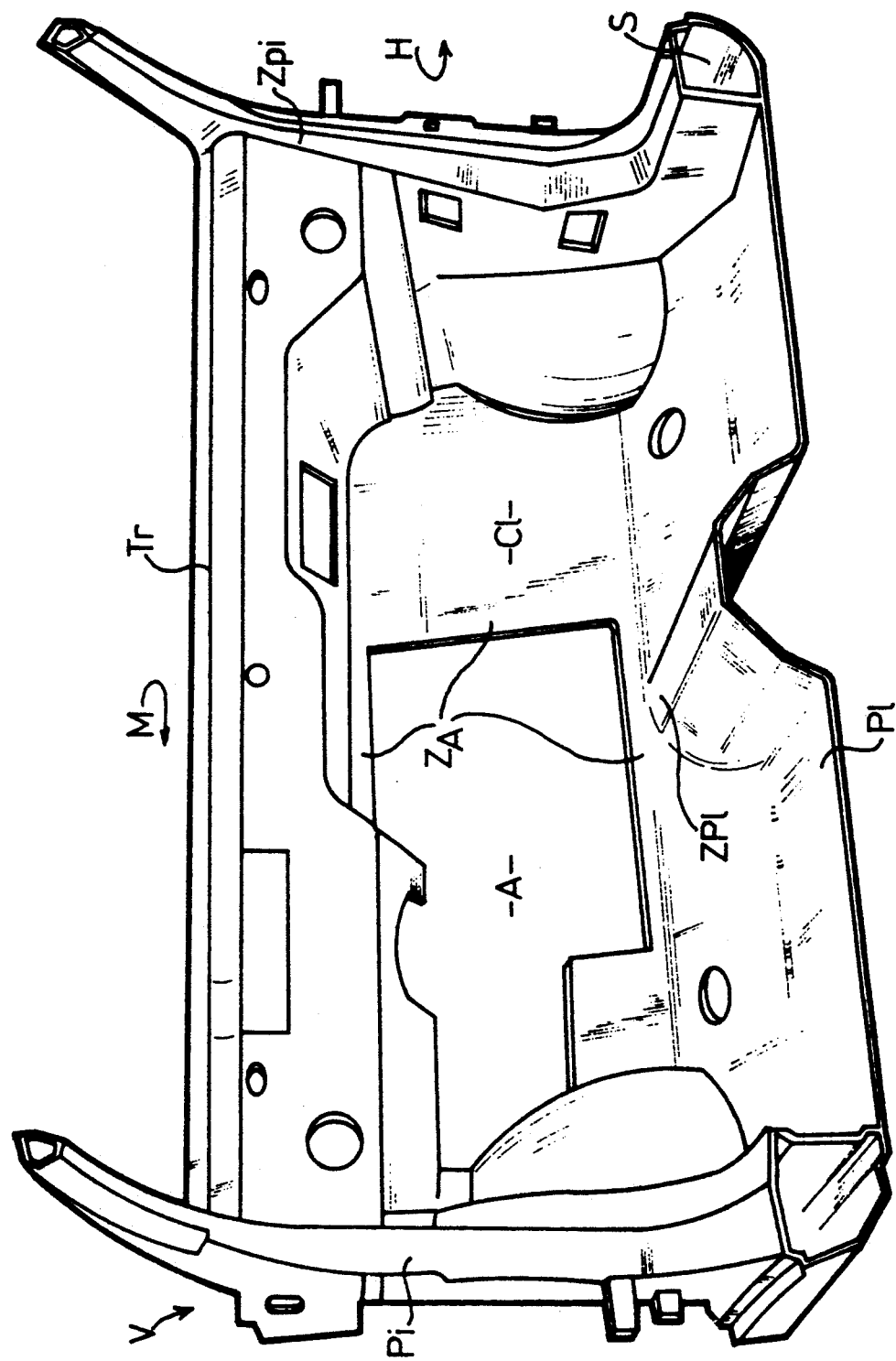
FIG. 1 is a partial perspective view of a conventional structure or shell of a traditional motor vehicle, as exhibited from the passenger-compartment side.
Figure 2:
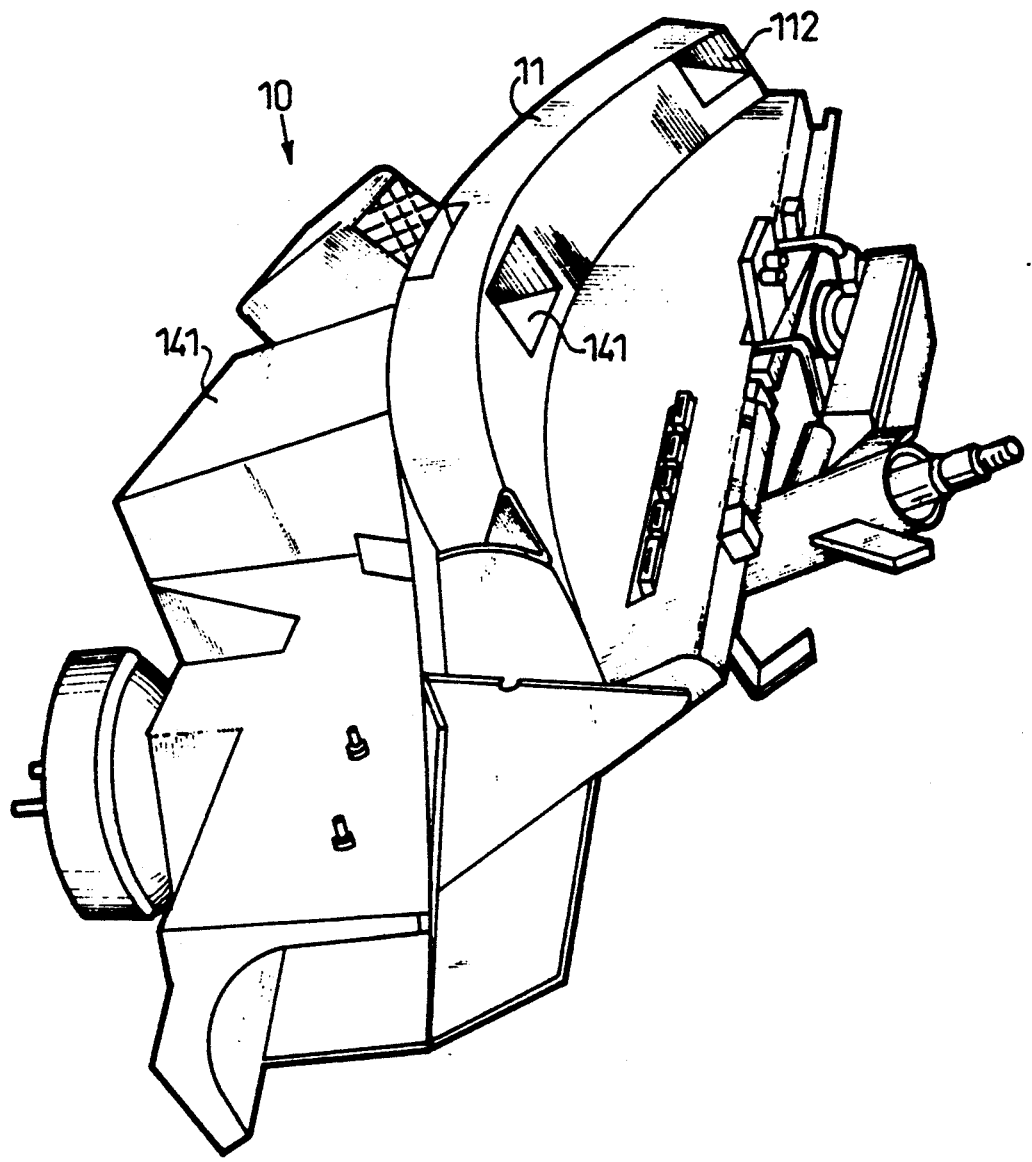
FIG. 2 is a perspective view, taken from the left, from the passenger-compartment side, of a partially equipped framework.
Figure 3:
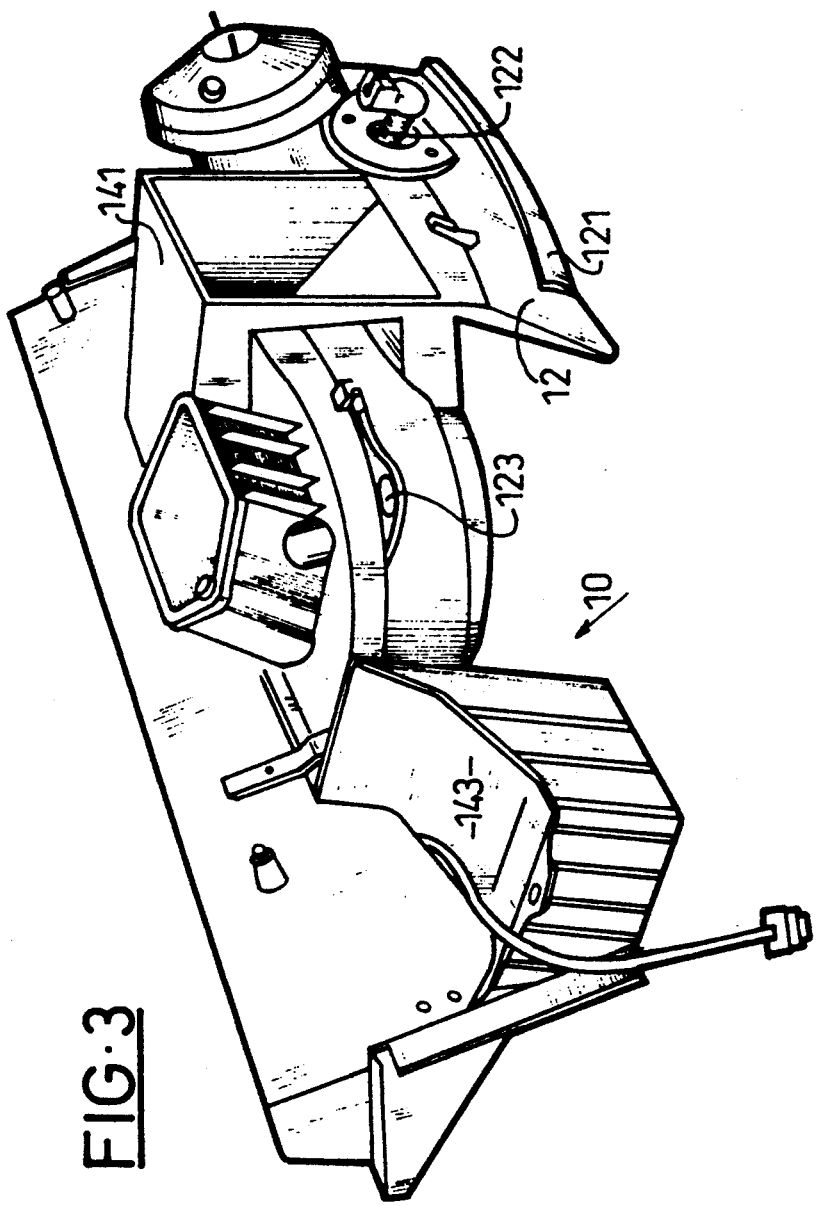
FIG. 3 is a perspective view of the framework of FIG. 2, taken from the right, from the front-compartment side.
Figure 4:
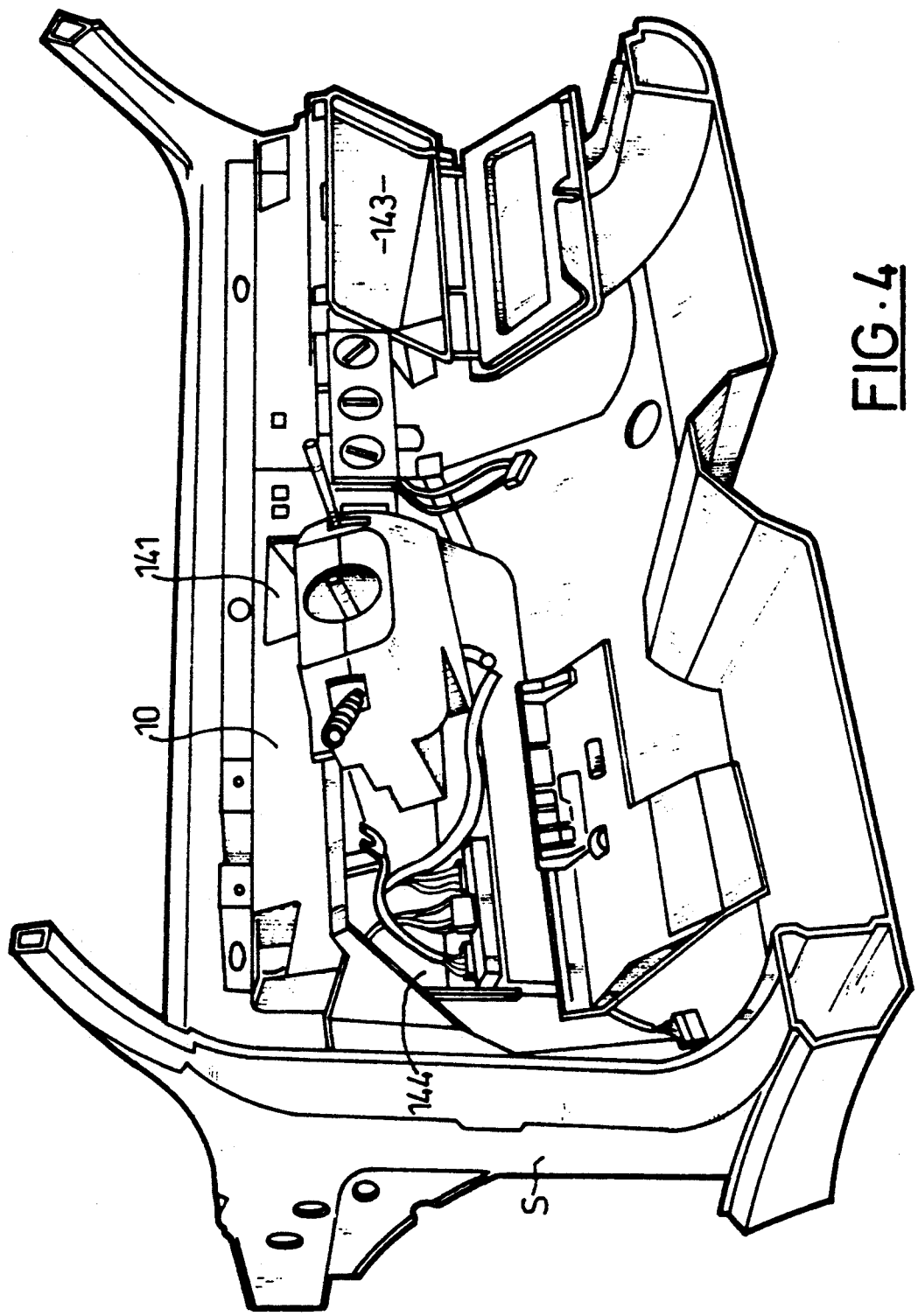
FIG. 4 is a perspective view of the framework of FIG. 2 in place in the structure of FIG. 1.
Figure 5:
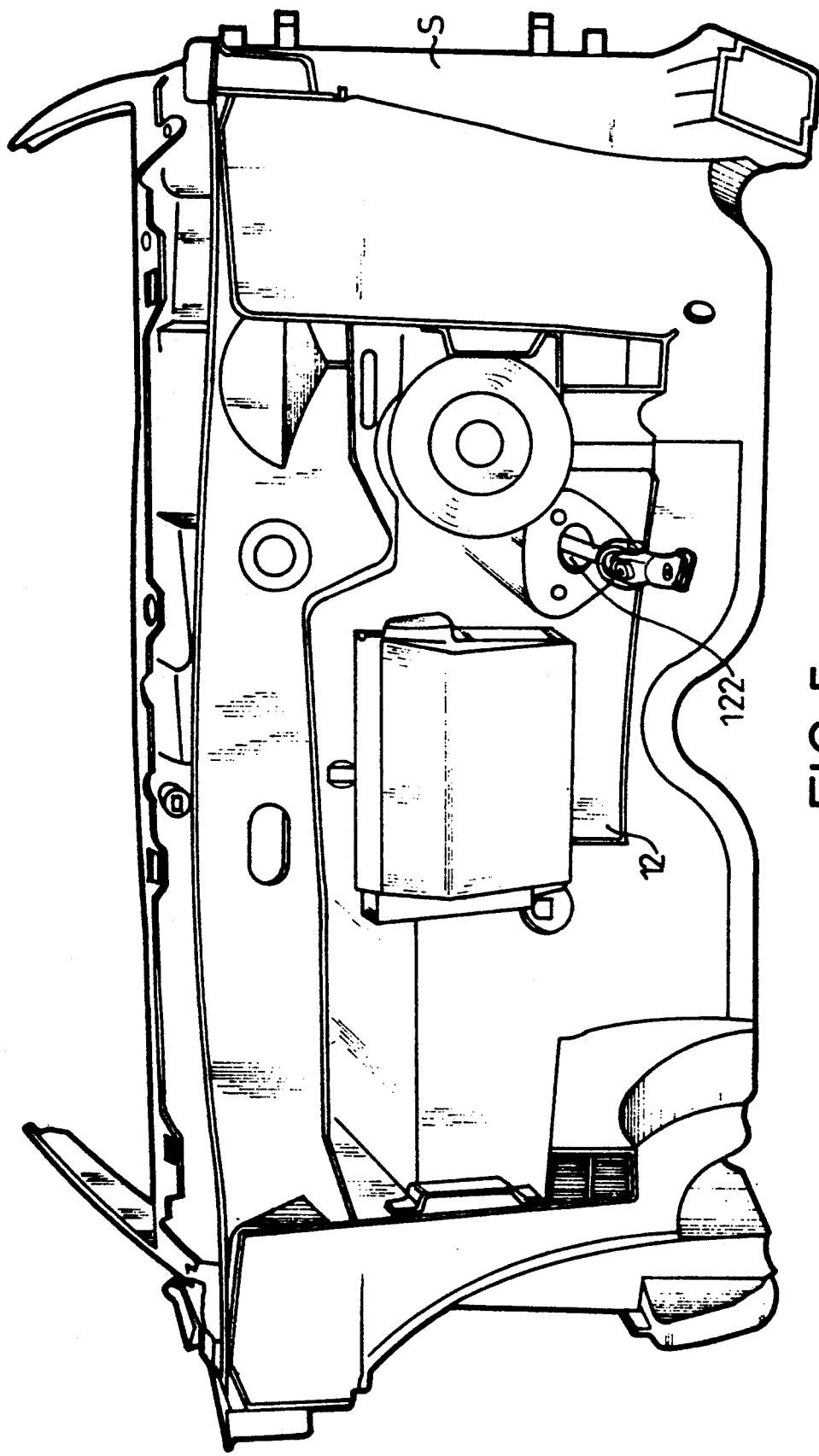
FIG. 5 is a view similar to that of FIG. 4, taken from the front-compartment side.
Figure 6:
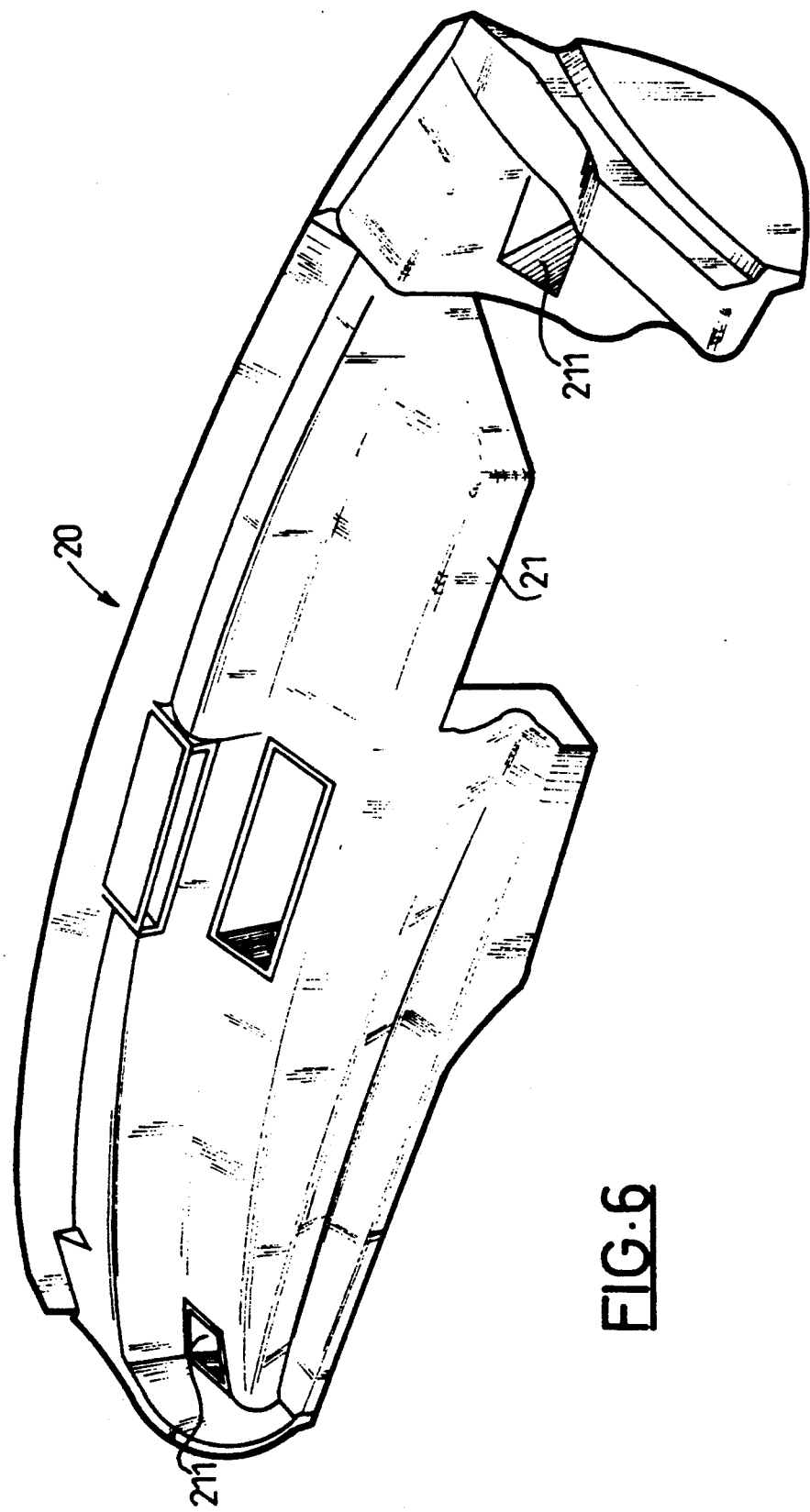
FIG. 6 is a perspective view of an inclined cover, taken from the left of the interior.
Figure 7:
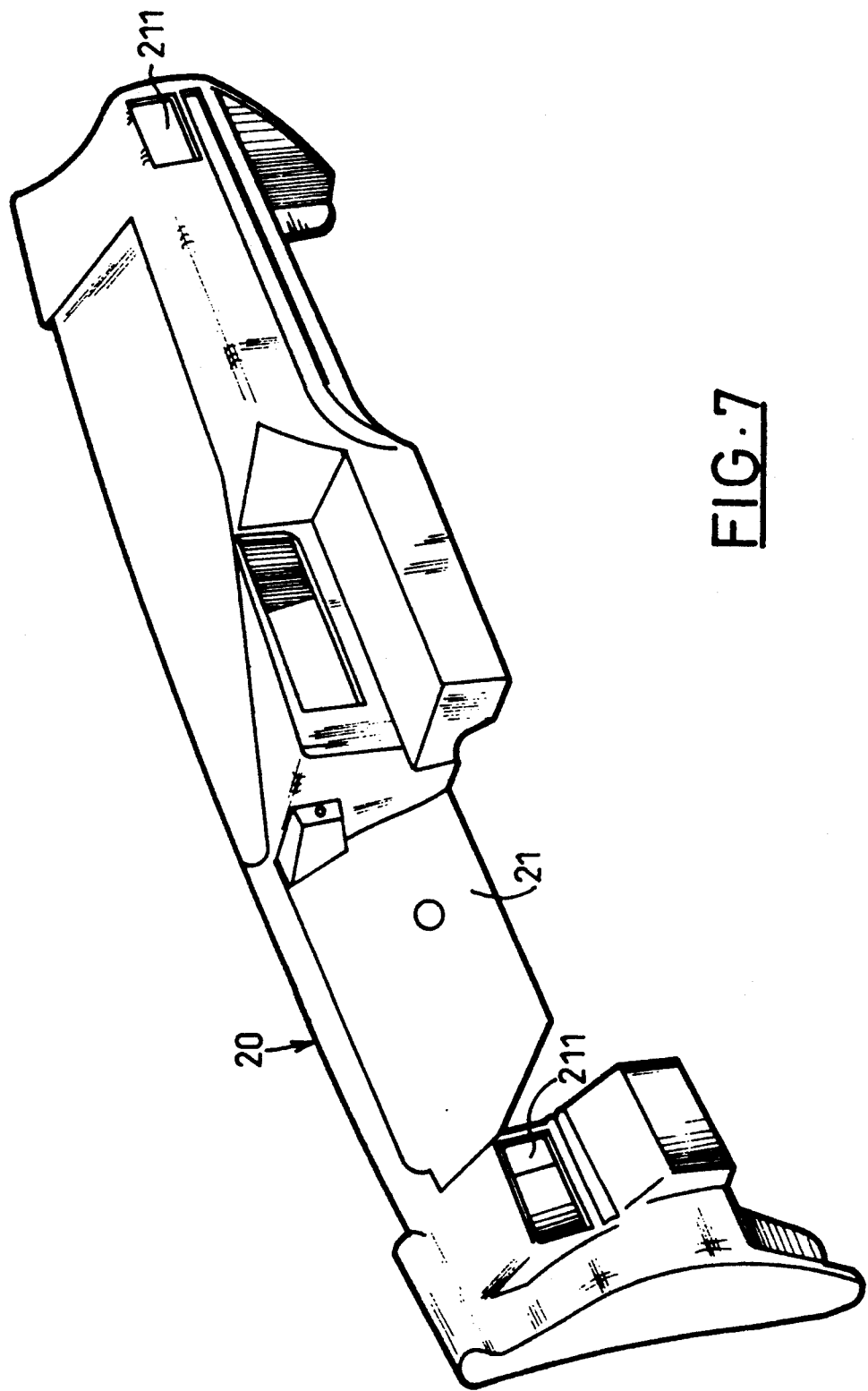
FIG. 7 is a view of the cover of FIG. 6, ready to be installed, taken from the outside.
Figure 8:
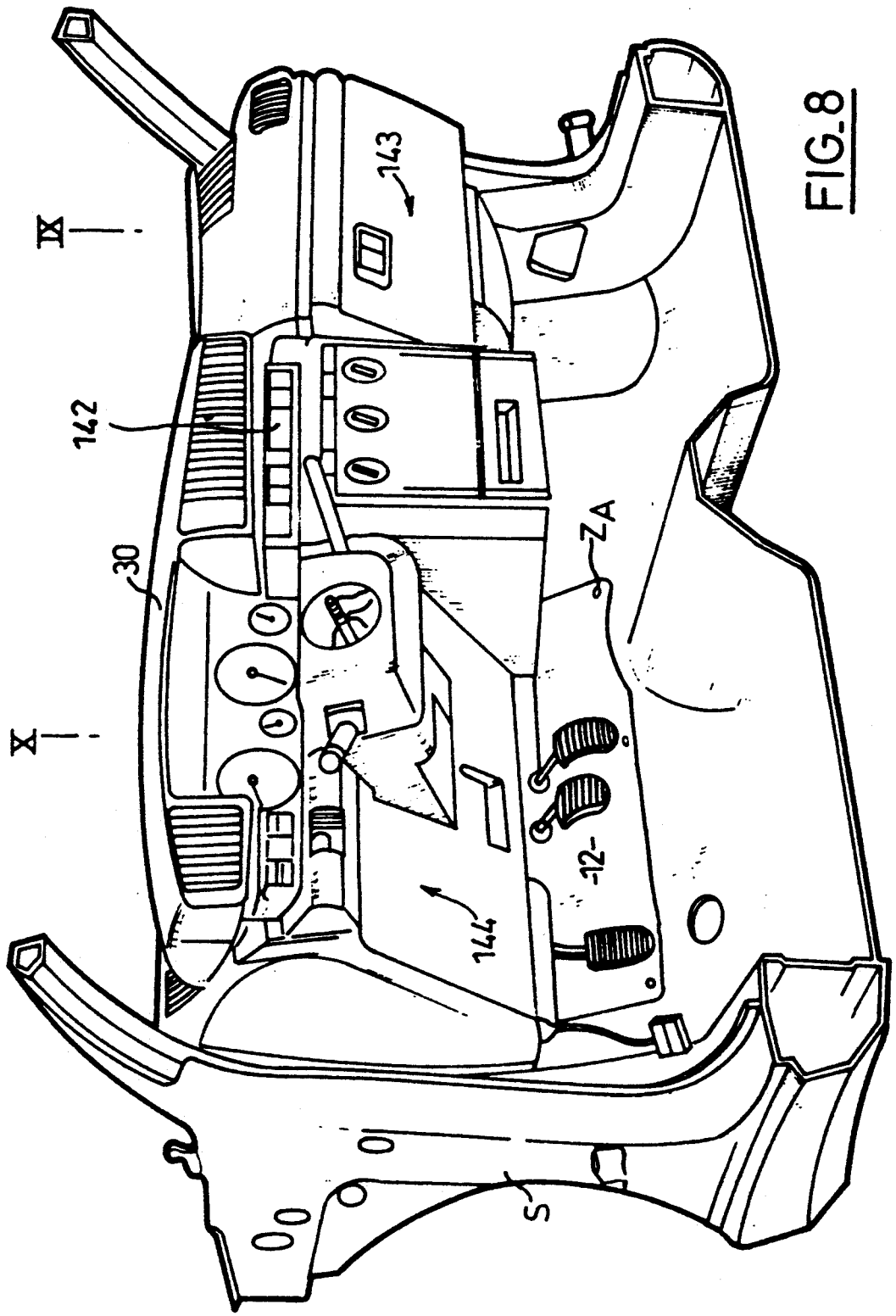
FIG. 8 is a view of one embodiment of the dashboard according to the invention in place in the structure of FIG. 1.
Figure 9:
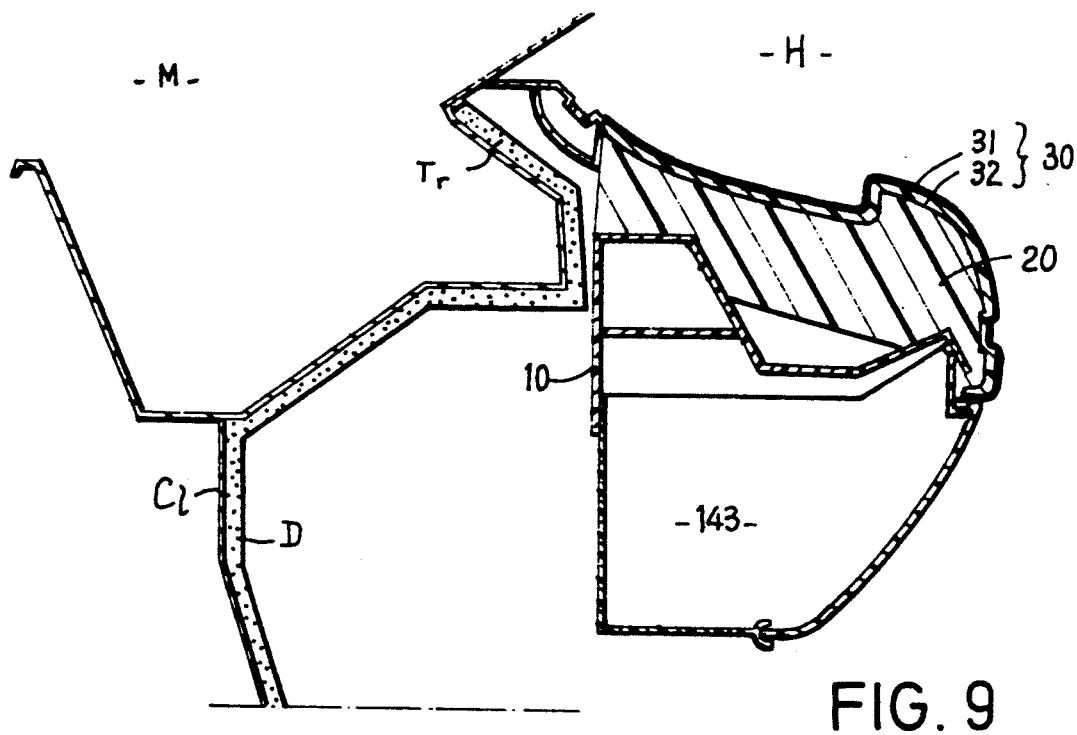
FIG. 9 is a partial cross-section along the vertical plane IX of FIG. 8.
Figure 10:
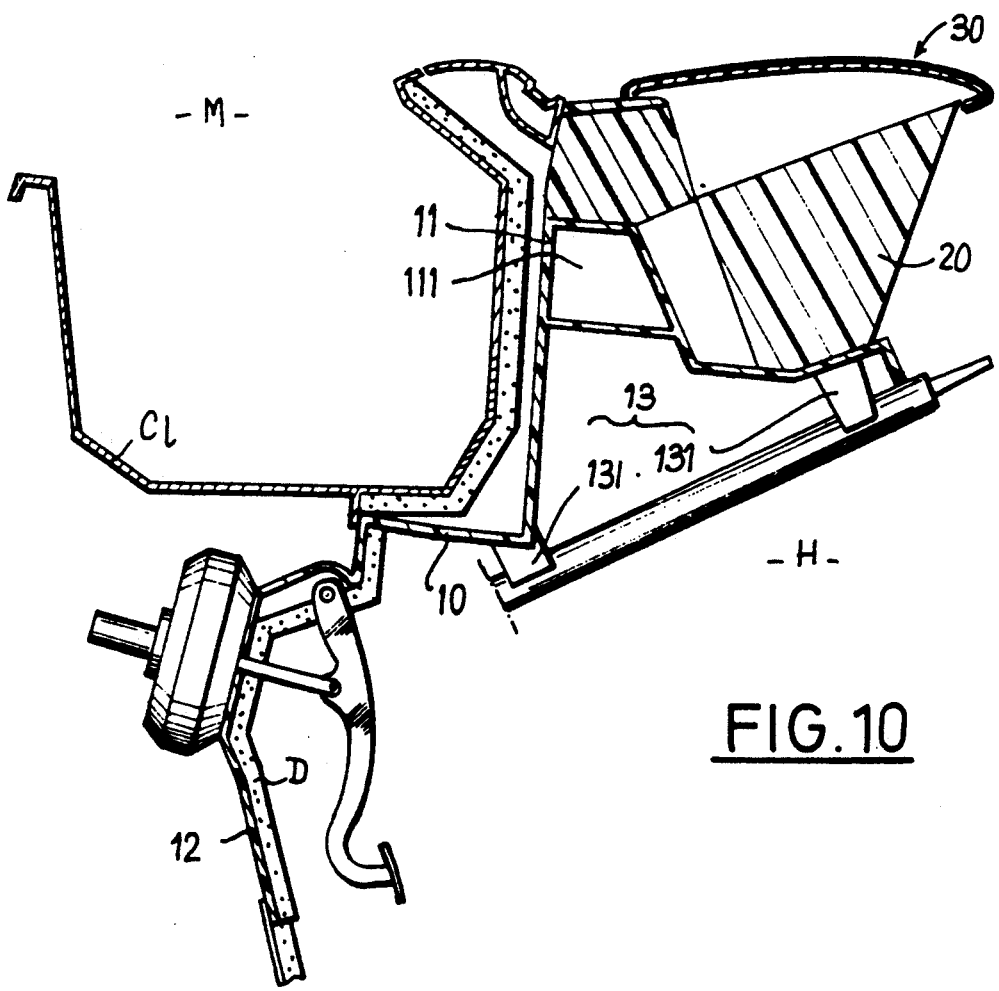
FIG. 10 is a partial cross-section along the vertical plane X of FIG. 8.

As may be seen, in particular in the partial view of FIG. 1, a vehicle V consists of a structure or shell S which delimits a passenger compartment H and a front compartment M, most often the engine compartment.

As may be observed, this structure S comprises, especially, a floor $P_1$ with two posts or lateral pillars $P_i$ which are intended to receive, especially, doors and which are usually joined by a cross member $T_r$; this cross member $T_r$ delimits the lower portion of a bay where a windscreen will be placed. A partition wall or bulkhead $C_1$ separates the front compartment M from the passenger compartment H. This partition wall $C_1$ is pierced through by an opening A of relatively small area and of relatively simple geometrical configuration for reasons which will become apparent below. This structure S is fitted, in the interior, with fixing zones Z. These fixing zones Z are preferably divided up into lateral zones $Z_{pi}$ on the posts or pillars $P_i$, a transverse zone $Z_{p1}$ on the floor $P_1$ and a central zone $Z_A$ in the vicinity of the opening A.

The position and the size of the opening A are chosen so as to group together, over a minimum area, all the connections between front compartment M and passenger compartment H so as to ensure a better soundproofing of the latter. This is why the steering column, the electrical-cable harness, the pedal bracket with its clutch and acceleration cables, the air-conditioning unit, the linkage for actuating opening/closing of the bonnet of the front compartment, etc. are brought together into this place.

This shell or structure S is made, conventionally, from elements which are most often joined together mechanically and/or welded.

An inner panel D covers the partition wall $C_L$ preferably on the passenger-compartment H side. This inner panel has a technical role and a comfort role. In fact, this inner panel, usually multi-layered, contributes to the protection against fire and also to the insulation of the passenger compartment so that noises from the front compartment and heat which it may emit do not propagate into the passenger compartment with the risk of disturbing the comfort of the occupants.

As may be observed in the various figures of the drawing, a dashboard according to the invention, intended to receive and support, in order to be equipped therewith, prefabricated and pretested subassemblies so as to constitute an entity ready to be installed in a vehicle and to be fixed, at least partially, to the partition wall of the latter separating the front compartment from the passenger compartment, essentially comprises, inter alia, an armature or framework 10, a cover 20 and a lining 30.

The framework 10, which is rigid and constructed so as to be self-supporting, has a relatively simple configuration. It has an essentially technical role by serving principally as a workshop support or rest and by contributing possibly to the robustness of the structure. This framework has practically no role in contributing to the presentation and appearance.

The framework 10 is made essentially from a section member 11, possibly from a panel 12, from at least one support 13 and from at least one cavity 14.

The section member 11, which is disposed transversely at the location which will constitute the top portion of the dashboard when the latter is installed in the passenger compartment, is exhibited in the manner of a box 111 which is especially prismatic and preferably open in the direction of the front compartment. For example, emergent vents 112, intended to be oriented towards the passenger compartment, are provided in the section member 11. These vents 112, the geometry, distribution and number of which are fixed according to requirements, are, for example, intended for the air conditioning of the passenger compartment as will be understood from the following text.

The panel 12, which, at an appropriate location, extends the section member 11 downwards, is relatively flat, at least locally, and has a configuration and an area adapted to that of the opening A. In particular, the panel 12 has a perimeter 121 intended to interact with the central fixing zone $Z_A$ of the opening A so as to close it off, as will be understood from the following text. In the panel 12 are provided passages 122 for essentially mechanical use; these passages permit the installation, in particular, of the steering column and of the pedal bracket with, possibly, its bearings, cables and brake servo so as to permit the transmission of the instructions of the driver, who is accomodated in the passenger compartment H, especially to the front compartment M where the main members necessary for controlling the vehicle are located. Lead-throughs 123, for essentially electrical use, are also provided in this panel 12; these lead-throughs permit electrical continuity with the aid of wires and/or connectors between that which is located on either side of the partition wall or bulkhead $C_1$.

The supports 13 are exhibited, for example, in the manner of protuberances 131. These supports are especially intended to receive the steering column with all its accessories, for example the "combination switch" for the actuation of the lighting, indicators of change of direction, audible warning device, etc.

The cavities 14 are exhibited in the manner of at least one housing 141, one receptacle 142, one case 143 and one enclosure 144 or the like.

The housing or housings 141 are intended for the air conditioning so as to receive, for example, air-flow distributors, exchangers or motor-driven fans, some of which are located in the passenger compartment H and certain others of which are located in the front compartment M. The receptacle 142 is, for example, intended to receive a radio assembly. The case 143 is, for example, intended to serve as a glove compartment and/or as a glove box. The box 144 is, for example, intended to receive the electrical equipment such as fuses and relays.

Therefore, it is thus possible to see what constitutes the essential technical role of this framework 10. It is this framework which supports, both during the construction of the vehicle and subsequently, the latter being completed and in working condition, the steering column and its accessories, the pedal bracket and its accessories, the air-conditioning unit and its accessories, the electrical equipment, etc.

The framework 10, once pre-equipped and checked, is fixed permanently to the structure S, especially in line with the lateral, transverse and central zones $Z_{Pi}$, $Z_{Pl}$ and $Z_A$ respectively. In order to do this, any standard conventional technique, appropriate especially to the nature of the materials to be joined, is used, for example welding, riveting, screwing, adhesive bonding, etc. Preferably, the fixing to the central zone $Z_A$ of the perimeter 121 of the panel 120 is performed by directly bearing against the partition wall $C_1$ so as to obtain a good seal which is optimised with the aid of an appropriate sealing member.

The cover 20 is intended to be attached to the framework 10 so as to be relatively interchangeable. This cover has a role which is virtually essentially intended for presentation.

This cover 20 consists principally of a cushion 21 which gives it, at least in part, its exterior shape. This relatively rigid cushion is pierced through especially by ducts 211, for example intended to be put into registration with the vents 112 in order to constitute, at least in part, air-conditioning or indeed defrosting vents.

This cover can be relatively easily removed. This is why the cover 20 is attached to the framework 10, to which it is fixed for example by screwing or by elastic snap-fastening. If necessary, this cover may be directly overmoulded onto the framework or alternatively adhesively bonded.

The lining 30, which is attached and is preferably interchangeable, is composed, on the external side of that which will constitute the exterior and which will be visible in the passenger compartment, of a covering or "skin" 31 under which on the internal side is a padding 32. It is this "skin" 31 which gives the final appearance and feel to the dashboard. This lining 30 is equipped in appropriate locations with orifices or clearances which are intended, where appropriate, to be brought into correspondence with the vents 112 and the various cavities 14.

The framework 10 is preferably made from at least one synthetic resin with fillers and fibres appropriate to the requirement, so as to impart to it the mechanical characteristics capable of rendering it self-supporting, so that it can serve especially as a workshop rest for those reasons which emerge from the above and from that which follows, as well as characteristics capable of enabling it to meet the standards decreed, by way of safety, and imposed by the public authorities.

The relatively simple geometrical configuration adopted enables such a framework 10 to be manufactured easily by conventional production techniques, for example injection or compression moulding or indeed by thermoforming.

Materials which are suitable for manufacturing the framework 10 are, for example, conventional thermoplastic resins (polypropylene, acetobutyratestyrene, filled or unfilled polyamides, Press-formable Reinforced Thermoplastics), thermosetting resins (SMC, DCPD, polydicyclopentadiene), etc. Of course, it is possible also to use an appropriate metal sheet, the shaping of which is obtained by conventional techniques, for example press-forming, deep-drawing, etc.

The cover 20 is made especially from a foam which is preferably rigid or indeed flexible, for example based on low-pressure polyurethane which, as is known, is very easy to mould, or alternatively based on polypropylene. By suitably choosing the material with which the cover is made, it is understood immediately that the latter contributes not only to the presentation of the dashboard according to the invention but also contributes to the safety of the occupants of the vehicle in the event of impact with a major front component, by absorbing at least a portion of the energy of the impact.

The lining 30 is also preferably made from a synthetic material. It may be constructed so that the "skin" 31 is exhibited in the manner of a relatively self-supporting preformed covering or shell, to which may be attached the padding 32 made for example from a flexible foam. Another manner of proceeding may consist in overmoulding the padding 32 onto the "skin" 31 or alternatively in arranging for this "skin" 31 to be formed by itself directly onto a dashboard according to the invention intended to receive and to support, in order to be equipped therewith, prefabricated and pretested subassemblies of a driver's cab, so as to constitute an entity ready to be installed in a vehicle and fixed, at least partially, to a partition wall of the latter which separates a front compartment from a passenger compartment of the structure and which is pierced through by an opening with fixing zones. This lining may also be constructed by rotational moulding or indeed by overmoulding.

Since the self-supporting framework 10 is manufactured as indicated previously, it is equipped with practically all the accessories necessary for control and which form the driver's cab, and a certain number of which have been enumerated especially at the beginning of the indroductory part. There will be recalled for example, for memory, the pedal bracket with the brake servo and the steering column, the air-conditioning unit, the electrical equipment, the dials, switches, etc. It is understood that this entity which constitutes the armature and everything which it supports may be prepared and tested, away from the actual assembly line of the vehicles, and comprise all; the permanent elements which are common to one model, regardless of the version and the options chosen by the customer who will receive the vehicle.

Next, this equipped armature receives the cover 20 with which beforehand, as required, are associated anti-reflection visors, air-conditioning nozzles, flaps, doors and lids for the housings, receptacles, cases and enclosures and, possibly, other decorative fittings. This cover is also equipped with that which will constitute the air-conditioning and/or defrosting ducts if these do not form an integral part, are not made as one body with the cushion. These ducts may be exhibited, for example, in the form of half-channels or the like which are assembled at this time. As has been indicated previously, this cover, which is attached, is relatively interchangeable and fixes, basically, the exterior configuration of the dashboard. Given its nature, this cover may be easily adapted to changes in fashion and, possibly, adapted to one particular model of one series of the vehicle.

Finally, the likewise attached and interchangeable lining 30 is fitted, and this, too, may follow the trends of fashion and/or the particular choice of options adopted by a customer so as, for example, to match the shade thereof to the type of seats and/or to the colour of the vehicle.

All the advantages of the invention are therefore understood. In fact, by virtue of the improved dashboard according to the invention, with a minimum of parts it is possible to incorporate the maximum number of manufacturer requirements concerning, especially, the ease of mounting and the low cost price, whilst also procuring better comfort and better safety and, in addition, also by satisfying the particular requirements of each customer.

The adoption of a relatively permanent and simplified framework which is rigid and self-supporting, on the one hand, and of a cover and a lining which are attached and interchangeable at different stages of production, either at the moment of the definition of a line or of a range, or at the moment of choice of the options offered to the purchaser, on the other hand, makes it possible to follow as closely as possible both the technical and economic requirements of the manufacturers and the wishes of the users, which are often presented as conflicting or contradictory. In fact, this results especially from the separation of the technical and presentational roles attributed to the components. The solution according to the invention enables, inter alia, good acoustic decoupling to be obtained between the associated elements.

It should also be noted that the improved dashboard according to the invention, beyond its direct contribution to safety, may also serve as a support for a possible self-inflating protective bag for the occupants of the front seats, often designated in the technical field by the name "air bag".

We claim:

1. Dashboard intended to receive and to support, for being equipped therewith, prefabricated and pretested subassemblies of a driver's cab so as to constitute an entity ready to be installed in a vehicle (V) and to be fixed, at least partially, to a partition wall ($C_1$ of the latter which separates a front compartment (M) from a passenger compartment (H) of the structure (S) and which is pierced through by an opening (A) with fixing zones (Z), which dashboard is characterised in that it comprises, inter alia, a rigid, self-supporting and permanent framework (10) which serves as support and which is fitted with a box-section member (11), a removably attached rigid cover (20) which approximately fixes exterior shape of the dashboard and a removably attached lining (30) which matches this cover (20) and fixes the appearance of the dashboard.

2. Dashboard according to claim 1, characterised in that the framework (10) comprises a virtually flat panel (12) with a perimeter, the size of which is adapted to that of this opening (A) so as to close it off and be held therein by fixing zones ($Z_A$).

3. Dashboard according to claim 1, characterised in that the framework (10) comprises at least one support (13).

4. Dashboard according to claim 1, characterised in that the framework (10) comprises at least one cavity (14).

5. Dashboard according to claim 1, characterised in that the box-section member (11) has a prismatic configuration (111) which is preferably open in the direction of the front compartment (M).

6. Dashboard according to claim 5, characterised in that the box (111)-section member (11) is pierced through by vents (112) emerging in the direction of the passenger compartment (H).

7. Dashboard according to claim 2, characterised in that the panel (12) is pierced through by passages (122) and by lead-throughs (123)

8. Dashboard according to claim 3, characterised in that the support (13) has the configuration of protuberances (131).

9. Dashboard according to claim 4, characterised in that the cavities (14) have the configuration of at least one housing (141), receptacle (142), case (143), enclosure (144).

10. Dashboard according to claim 1, characterised in that the cover (20) is a cushion (21) made form rigid foam.

11. Dashboard according to claim 10, characterised in that the cushion (21) is provided with ducts (211) intended to be put into local registration with the vents (112).

12. Dashboard according to claim 1, characterised in that the lining (30) is presented in the manner of an external covering (31) with an internal padding (32).

13. Dashboard according to claim 12, characterised in that the covering (31) and padding (32) are attached to one another.

14. Dashboard according to claim 12, characterised in that the covering (31) and padding (32) form one body.

15. Dashboard according to claim 1, characterised in that the framework (10) is made from synthetic resin preferably filled and reinforced by fibres.

16. Dashboard according to claim 10, characterised in that the cover (20) is made form a low-density foam.

17. Dashboard according to claim 14, characterised in that covering (31) and padding (32) are made by an overmoulding operation or have formed by themselves.

* * * * *